(12) United States Patent
Scheper et al.

(10) Patent No.: US 9,511,642 B2
(45) Date of Patent: Dec. 6, 2016

(54) MOTOR VEHICLE HAVING A VEHICLE FRAME AND ARTICULATION ARRANGEMENT

(71) Applicant: ZF Friedrichshafen AG, Friedrichshafen (DE)

(72) Inventors: Frank Scheper, Loeningen (DE); Jens Eismann, Melle (DE); Friedhelm Langhorst, Diepholz (DE); Sören Knopp, Stemwede (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/409,022

(22) PCT Filed: Jun. 6, 2013

(86) PCT No.: PCT/EP2013/061676
§ 371 (c)(1),
(2) Date: Oct. 1, 2015

(87) PCT Pub. No.: WO2014/005787
PCT Pub. Date: Jan. 9, 2014

(65) Prior Publication Data
US 2016/0185172 A1 Jun. 30, 2016

(30) Foreign Application Priority Data
Jul. 3, 2012 (DE) .......................... 10 2012 013 149

(51) Int. Cl.
*B60G 9/02* (2006.01)
*B60G 7/00* (2006.01)

(52) U.S. Cl.
CPC ................. *B60G 9/02* (2013.01); *B60G 7/008* (2013.01); *B60G 2200/315* (2013.01);
(Continued)

(58) Field of Classification Search
CPC ..... B60G 9/02; B60G 7/008; B60G 2200/343; B60G 2200/315; B60G 2200/34
See application file for complete search history.

(56) References Cited

U.S. PATENT DOCUMENTS 2,319,430 A * 5/1943 Olley ...................... B60G 9/00 180/352
5,564,521 A * 10/1996 McLaughlin ............ B60G 9/00 180/352
(Continued)

FOREIGN PATENT DOCUMENTS

| DE | 601 02 843 T2 | 4/2005 |
| DE | 10 2008 001 157 A1 | 11/2009 |
| EP | 1 120 299 A1 | 8/2001 |
| JP | H11-321260 A | 11/1999 |

OTHER PUBLICATIONS

German Search Report Corresponding to 10 2012 013 149.6 mailed May 3, 2013.
(Continued)

*Primary Examiner* — Drew Brown
(74) *Attorney, Agent, or Firm* — Davis & Bujold, PLLC; Michael J. Bujold

(57) ABSTRACT

A motor vehicle, in particular a utility vehicle (UV), with a vehicle frame (2) and at least one vehicle axle (5) supported relative to the vehicle frame (2) by one or more connecting rods (6; 7). The connecting rod or rods (6; 7) is/are linked to the vehicle axle (5) by at least one articulated arrangement (8) which is connected, by connecting elements (11) that pass through contact surfaces (10; 10a), to a support block (12) fixed on the axle (5). The axis (13) of each connecting element (11) extends through the contact surface (10; 10a), through which the respective connecting element (11) passes, at an angle (α) different from 90°.

9 Claims, 4 Drawing Sheets

(52) U.S. Cl.
CPC .... *B60G 2200/324* (2013.01); *B60G 2200/34* (2013.01); *B60G 2200/343* (2013.01); *B60G 2200/344* (2013.01); *B60G 2206/123* (2013.01); *B60G 2206/124* (2013.01)

(56) References Cited

U.S. PATENT DOCUMENTS

| | | | | |
|---|---|---|---|---|
| 6,231,264 | B1* | 5/2001 | McLaughlin | F16C 11/0614 180/352 |
| 6,814,175 | B2* | 11/2004 | Leen | B60G 7/001 180/349 |
| 8,783,993 | B2 | 7/2014 | Brunneke et al. | |
| 2001/0009321 | A1 | 7/2001 | Toyoshima et al. | |
| 2003/0089546 | A1 | 5/2003 | Bjorkgard | |
| 2004/0012167 | A1* | 1/2004 | Buhl | B60G 7/005 280/124.1 |
| 2009/0134593 | A1 | 5/2009 | Angerfors et al. | |
| 2013/0011217 | A1* | 1/2013 | Avellon | F16B 2/005 411/500 |
| 2013/0319163 | A1* | 12/2013 | Davies | B62D 1/184 74/493 |

OTHER PUBLICATIONS

International Search Report Corresponding to PCT/EP2013/061676 mailed Jul. 10, 2013.
Written Opinion Corresponding to PCT/EP2013/061676 mailed Jul. 10, 2013.

\* cited by examiner

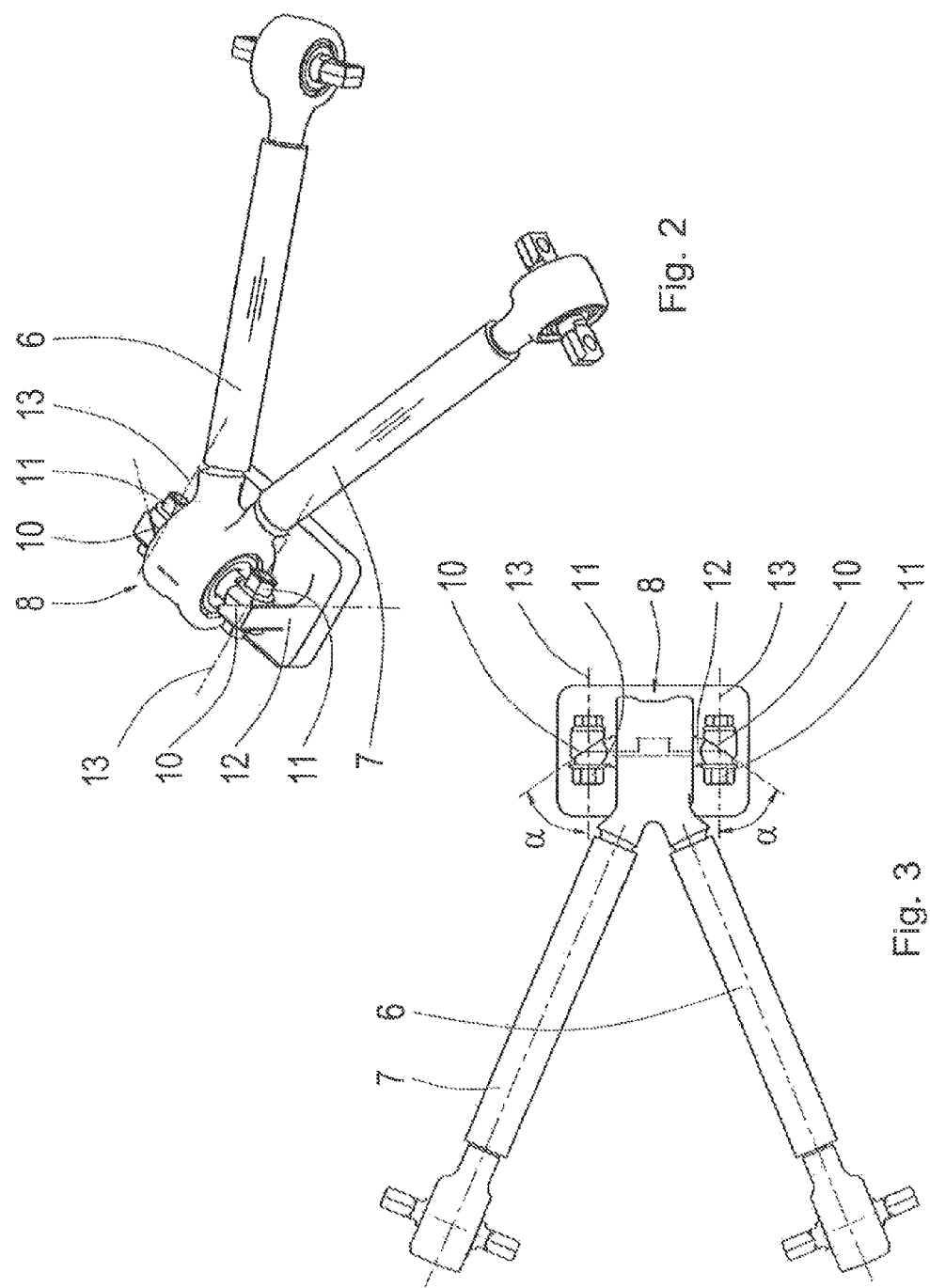

GROOVES/CORRUGATIONS

MOTOR VEHICLE HAVING A VEHICLE FRAME AND ARTICULATION ARRANGEMENT

This application is a National Stage completion of PCT/EP2013/061676 filed Jun. 6, 2013, which claims priority from German patent application serial no. 10 2012 013 149.6 filed Jul. 3, 2012.

FIELD OF THE INVENTION

The invention concerns a motor vehicle, in particular a utility vehicle (UV), with a vehicle frame and at least one axle supported relative to the vehicle frame by one or more connecting rods, wherein the connecting rod or rods is/are linked to the axle by at least one articulation arrangement which is connected by connecting means that pass through contact surfaces to a support block fixed on the axle.

BACKGROUND OF THE INVENTION

It is known to achieve such supporting means for example with a wishbone arrangement, in which the wishbone apex is bolted by way of an articulation arrangement to a support block associated with the axle, for example a rear axle, the axle having an axle body expanded in the middle in a ball shape. In this case the bolts pass axially on the outside through the axle body of the articulation arrangement and the support block. The bolts pass through the contact surfaces perpendicularly, so that at the contact surfaces only around 10% of the screw force applied is converted into normal force. However, this pre-stressing normal force prevents the components held together along the contact surfaces from moving relative to one another in a direction in the plane of the contact surfaces. It is therefore important to ensure a sufficiently large normal force.

But since the friction coefficients at the contact surfaces can vary markedly (according to the literature by a factor of three), such connections have to be made oversized in order to reliably prevent loosening of the joints even when a large force is applied transversely to the axis of the connecting means. This entails higher material costs and additional weight of the components.

SUMMARY OF THE INVENTION

The present invention addresses the problem of achieving an improvement in this regard.

The invention solves that problem with a motor vehicle having the characteristics described below, and with an articulation arrangement having the characteristics as described below.

By virtue of the invention, in that at the contact surfaces the axis of each connecting means passes through the contact surfaces concerned at an angle different from 90°, the result is that the force of the screw connection is divided into a normal and a transverse component. Thus, a shape-interlocking component is produced which allows the pre-stressing proportion to be increased considerably. Consequently on the one hand this allows the nominal screw size to be reduced, so saving material costs and weight. Furthermore, the tightening process for the screw connection can be substantially less precise, so that process costs are reduced and the reliability of the joint is increased. Thanks to the smaller screws, the axle body in the articulation can be made smaller, thereby further reducing weight and costs. Moreover, the demands on surface quality can also be less strict.

To produce as high a pre-stress as possible, it is appropriate for the respective axis of the connecting means to pass through the contact surfaces concerned at an angle between 30° and 60° relative to a vector lying in the contact surfaces.

In particular, for an optimum combination between friction force locking and shape interlocking, the respective axes of the connecting means pass through the associated contact surfaces at an angle of around 45° relative to a vector lying in the contact surfaces.

If when viewed from above the contact surfaces are inclined relative to a longitudinal and to a transverse axis of the vehicle, the main force directions between the axle and the vehicle frame, namely transverse and longitudinal movements, also act at an angle to the contact surfaces and therefore assist to a lesser extent the shearing of the components connected there relative to one another, so that the security of the joint is additionally enhanced. A further contribution to this security against the action of forces in the plane of the contact surfaces is provided by corrugating the contact surfaces or adopting similar, friction-promoting measures.

In particular, for each joint arrangement two axially external contact surfaces are inclined in opposite directions to one another relative to a transverse axis of the vehicle, and can thus contain the joint arrangement between them in the manner of outer walls.

Expediently, these can form a so-termed paw with an axle body comprising a ball-shaped portion, the axle body being provided axially on the outside with contact surfaces and apertures for connecting means.

An articulation and/or mounting arrangement is claimed separately. This can be used in vehicles such as passenger cars, utility vehicles or even building-site machines.

BRIEF DESCRIPTION OF THE DRAWINGS

Further advantages and features of the invention emerge from the example embodiments of the object of the invention illustrated in the drawing and described below.

The drawing shows:

FIG. 2: A perspective view of the wishbone with its connection to the rear axle, FIG. 3: The components of FIG. 2 as viewed from above.

DETAILED DESCRIPTION OF THE PREFERRED EMBODIMENTS

Figure 1:
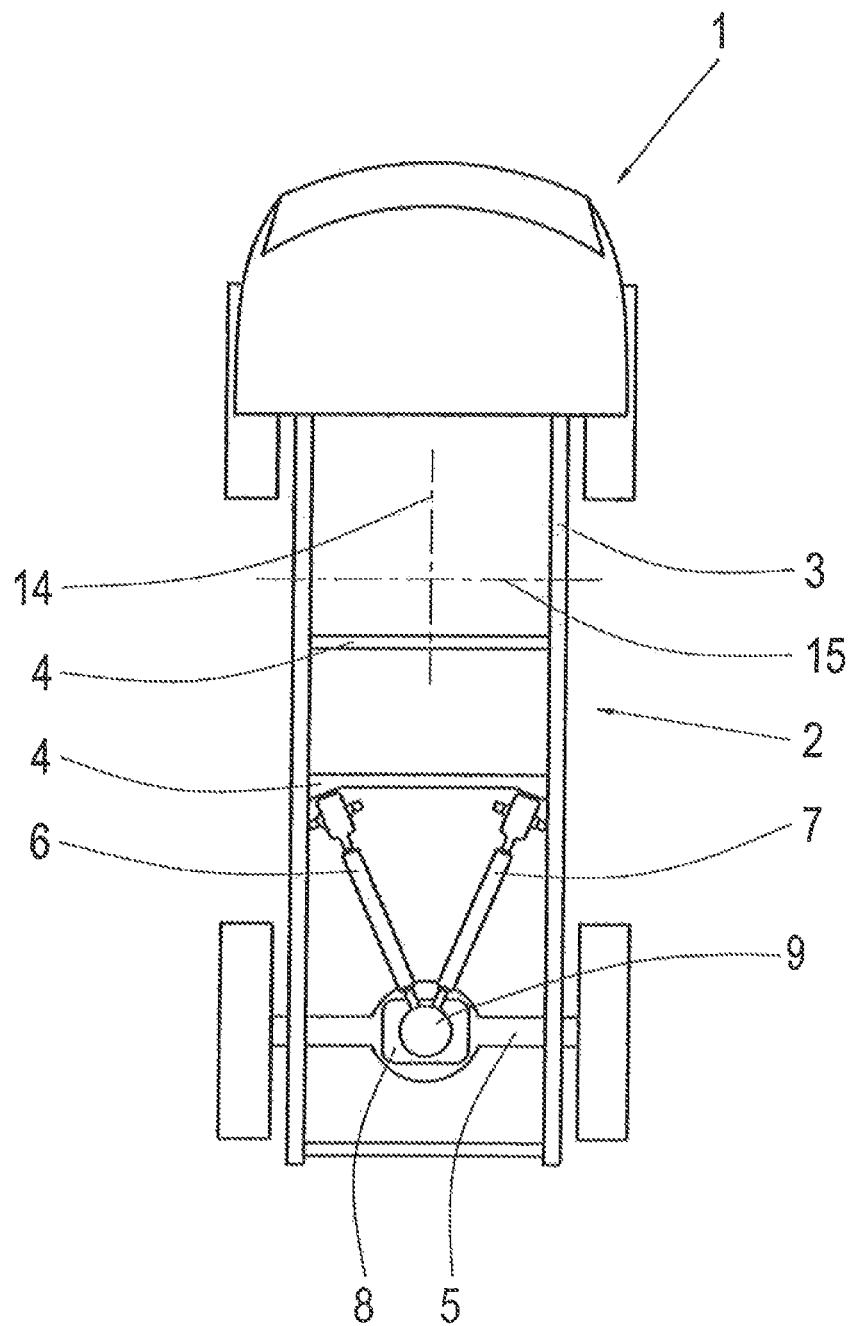
FIG. 1: A schematic plan view of a utility vehicle with a rear axle supported by means of a wishbone.

The motor vehicle 1 represented schematically in FIG. 1 is in this case a utility vehicle (UV) and comprises a vehicle frame 2 with longitudinal support members 3 and transverse support members 4. The vehicle frame 2 can be designed in various ways. On the vehicle frame is mounted at least one axle 5, for example a rear axle. Again as examples, a building-site vehicle or an off-road vehicle can also be designed according to the invention.

The arrangement shown in this case comprises two connecting rods 6, 7 arranged as a wishbone link and, as seen from above, extending in an acute-angled V shape. At the apex of the wishbone so formed, these are connected to the vehicle axis 5 by way of an articulation arrangement 8. In the central area of the transverse direction of the vehicle, the vehicle axis is expanded to accommodate a differential. The articulation arrangement 8 can be fitted on the upper end of the area of the rear axle 5 expanded to accommodate a differential, and can therefore form a transverse guide and a longitudinal guide for the vehicle axle 5. The—in this case two—supporting connecting rods 6, 7 can themselves be connected at their upper ends, for example to the load-bearing frame components 3—this not being illustrated in any detail here. Instead of wishbone arrangements, it is also possible for example to consider four-point links, X-shaped as viewed from above, or other arrangements.

The articulation arrangements 8 are often also referred to as paws. Such an articulation arrangement comprises an axle body 9 with a ball-shaped portion, provided transversely on the outside with contact surfaces 10 and apertures for connecting means 11.

In the drawing the connecting means 11 are designed as countered screw-bolts which pass through the contact surfaces 10 of the articulation arrangement 8 as well as through opposite contact surfaces 10 of a support block 12 connected fixed to the axle 5. The axis 13 of each of the connecting means 11 is at an angle α different from 90° relative to the contact surface 10 through which it passes.

The angle α amounts to between 30° and 60° relative to a vector lying in the contact surface 10.

Optimally, the axis 13 of the connecting means 11 concerned extends through the contact surface 10 through which it passes at an angle of around 45° relative to a vector lying in the contact surface 10. This gives an optimum distribution between shape interlock and friction-force locking. The forces mainly occurring, parallel to the longitudinal axis 14 of the vehicle or parallel to a transverse axis 15 of the vehicle, can be absorbed equally well.

Figure 4:
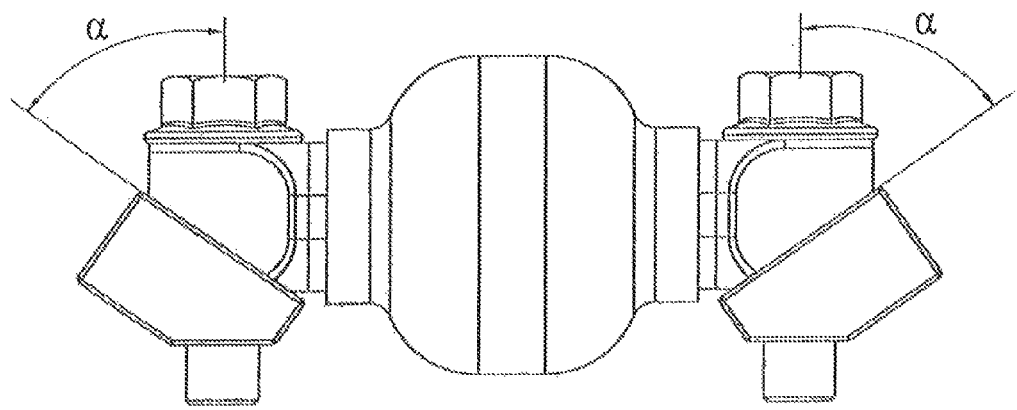
FIG. 4: A detail of the connection of the articulation arrangement to the rear axle, viewed from above, in this case showing only the axle body portion expanded transversely and centrally in a ball shape, with additional indication of force vectors.

In this case it is particularly appropriate for the shape interlocking proportion if the contact surfaces 10, as viewed from above, extend at an angle to a longitudinal axis 14 and to a transverse axis 15 of the vehicle, particularly in such manner that for each articulation arrangement 8, two axially external contact surfaces 10 are provided between the axle body 9 and the support block 12 and these surfaces are angled in opposite directions relative to a transverse axis 15 of the vehicle, as can be seen clearly, for example, in FIG. 4. Thus, any force in the transverse direction is supported equally well by the articulation arrangement 8.

Figure 5:
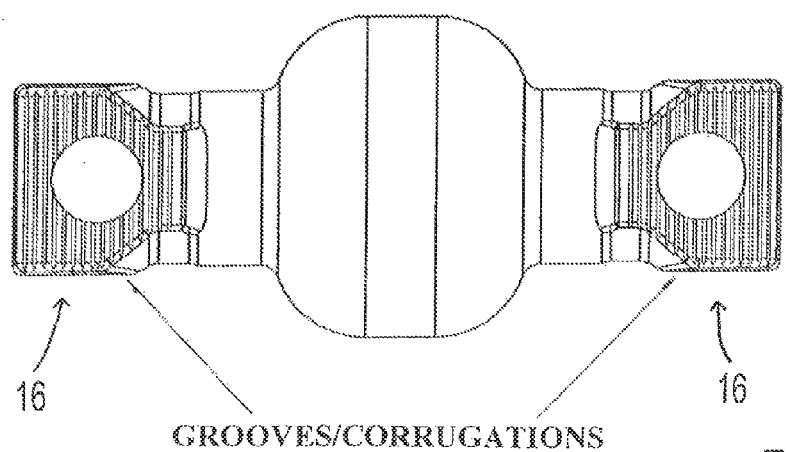
FIG. 5: The connection of the axle body by way of the contact surfaces, as seen from the front.
Figure 6:
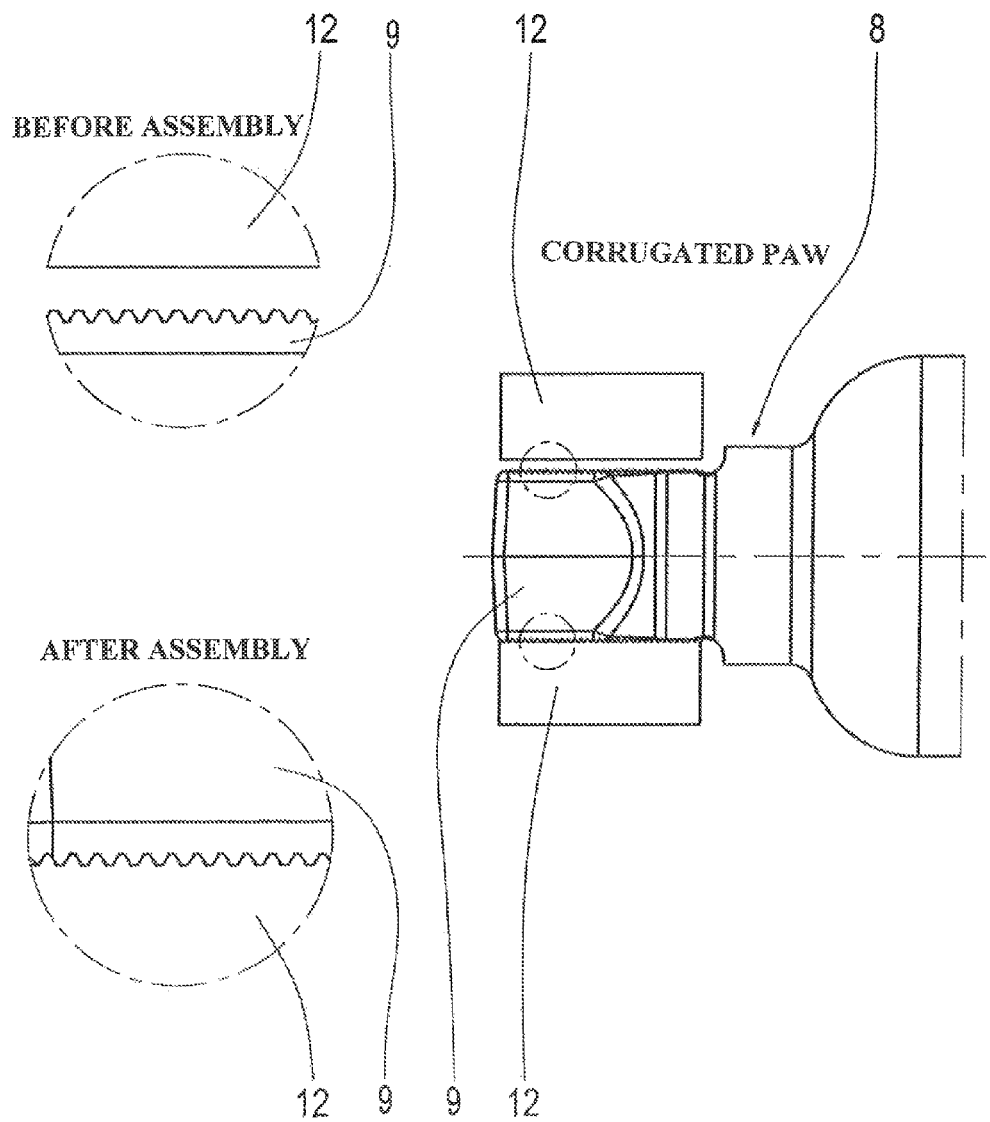
FIG. 6: A schematic representation of an axle body of the articulation arrangement provided with corrugations, showing enlarged detail sections before and after assembly.

Furthermore, the friction coefficient of the contact surfaces 10 can be increased by providing the surfaces with corrugations 16 as indicated in FIGS. 5 and 6. During assembly the corrugations 16 of the hard axle body 9 can press into the softer support block 12, producing on the latter a negative contour of the corrugations 16 which results in shape-interlocked fixing (see FIG. 6 left: before assembly, after assembly).

Moreover, it is also possible for the contact surfaces 10 not to be straight in each case, but rather for one contact surface (not shown) to be curved, for example concave with an inclination increasing toward the outside.

An articulation arrangement 8 as described can be provided at various locations, in particular within the chassis or for its connection to a motor vehicle 1, and is therefore claimed separately.

INDEXES

1 Motor vehicle
2 Vehicle frame
3 Longitudinal support member
4 Transverse support member
5 Vehicle axle
6 Connecting rod
7 Connecting rod
8 Articulation arrangement
9 Axle body
10 Contact surface
11 Connecting means
12 Support block
13 Axis of the connecting means
14 Longitudinal axis
15 Transverse axis
16 Corrugations

The invention claimed is:

1. A motor vehicle comprising a vehicle frame (2) and at least one vehicle axle (5) supported relative to the vehicle frame (2) by at least one connecting rod (6; 7),
the at least one connecting rod (6; 7) being linked to the vehicle axle (5) by at least one articulation arrangement (8) which is connected, by connecting means (11) that pass through planar contact surfaces (10; 10*a*), to a support block (12) fixed on the vehicle axle (5),
an axis (13) of each of the connecting means (11) extends through the planar contact surface (10; 10*a*), through which the connecting means (11) passes, at an angle (α) other than 90°.

2. The motor vehicle (1) according to claim 1, wherein the axis (13) of the connecting means (11) extends through the planar contact surface (10), through which the connecting means (11) passes, at an angle (α) of between 30° and 60° relative to a vector lying in the planar contact surface (10).

3. The motor vehicle (1) according to claim 2, wherein the axis (13) of the connecting means (11) extends through the planar contact surface (10), through which the connecting means (11) passes, at an angle of around 45° relative to a vector lying in the planar contact surface (10).

4. The motor vehicle (1) according to claim 1, wherein the connecting means (11) comprise countered screw or bolts.

5. The motor vehicle (1) according to claim 1, wherein, when viewed from above, an entirety of each of the planar contact surfaces (10; 10*a*) is positioned at an angle relative to a longitudinal axis (14) of the vehicle and relative to a transverse axis (15) of the motor vehicle.

6. An articulation arrangement (8) for use in a motor vehicle (1) comprising a vehicle frame (2) and at least one vehicle axle (5) supported relative to the vehicle frame (2) by at least one connecting rod (6; 7),
the at least one connecting rod (6; 7) being linked to the vehicle axle (5) by at least one articulation arrangement (8) which is connected, by connecting means (11) that pass through planar contact surfaces (10; 10*a*), to a support block (12) fixed on the vehicle axle (5),
an axis (13) of each one of the connecting means (11) extends through the planar contact surface (10; 10*a*), through which the connecting means (11) passes, at an angle (α) different from 90°,
the articulation arrangement (8) is in a form of a paw with an axle body (9) comprising a ball-shaped portion, and
the axle body (9) being provided, axially on an outside thereof, with the planar contact surfaces (10; 10*a*) and apertures for the connecting means (11).

7. The articulation arrangement (8) according to claim 6, wherein for each articulation arrangement (8), two axially external planar contact surfaces (10; 10*a*) are provided, and the two axially external planar contact surfaces are angled oppositely to one another relatively to a longitudinal axis (14) of the motor vehicle.

8. The articulation arrangement (8) according to claim 6, wherein the planar contact surfaces (10; 10*a*) are provided with corrugations (16).

9. A motor vehicle comprising a vehicle frame and at least one vehicle axle that is supported relative to the vehicle frame by at least one connecting rod,

- the vehicle frame defining a longitudinal axis and a transverse axis,
- a pair of connecting rods being linked to the vehicle axle by at least one articulation arrangement and a support block,
- the at least one articulation arrangement being connected to the support block which is fixed to the vehicle axle by connecting elements,
- the articulation arrangement and the support block each comprising a planar contact surface and a through bore,
- the planar contact surface of the articulation arrangement abutting against the planar contact surface of the support block such that the through bores thereof are coaxially aligned,
- the articulation arrangement being coupled to the support block by the connecting elements that extend through the through bores and the planar contact surfaces thereof, and
- each of the connecting elements defining an axis that extends at an angle that is either greater than or less than 90° relative to the planar contact surfaces.

\* \* \* \* \*